(12) United States Patent
Bottcher et al.

(10) Patent No.: US 10,241,006 B2
(45) Date of Patent: Mar. 26, 2019

(54) METHOD FOR MONITORING THE OPERATION OF A GAS TURBINE

(71) Applicant: Siemens Aktiengesellschaft, Munich (DE)

(72) Inventors: Andreas Bottcher, Mettmann (DE); Peter Kaufmann, Moers (DE); Tobias Krieger, Oberhausen (DE); Jaap van Kampen, AR Roermond (NL)

(73) Assignee: Siemens Aktiengesellschaft, Munich (DE)

( * ) Notice: Subject to any disclaimer, the term of this patent is extended or adjusted under 35 U.S.C. 154(b) by 297 days.

(21) Appl. No.: 14/423,715

(22) PCT Filed: Jul. 25, 2013

(86) PCT No.: PCT/EP2013/065732
§ 371 (c)(1),
(2) Date: Feb. 25, 2015

(87) PCT Pub. No.: WO2014/032875
PCT Pub. Date: Mar. 6, 2014

(65) Prior Publication Data
US 2015/0204760 A1  Jul. 23, 2015

(30) Foreign Application Priority Data
Aug. 30, 2012 (DE) .................. 10 2012 215 410

(51) Int. Cl.
*G01H 1/16* (2006.01)
*G01M 15/14* (2006.01)
(Continued)

(52) U.S. Cl.
CPC ............ *G01M 15/14* (2013.01); *G01H 1/003* (2013.01); *G01H 17/00* (2013.01)

(58) Field of Classification Search
CPC .............................. G01M 15/14; G01H 17/00
(Continued)

(56) References Cited

U.S. PATENT DOCUMENTS

| 4,887,468 | A |   | 12/1989 | McKendree et al. |
| 5,069,071 | A | * | 12/1991 | McBrien ................ G01H 11/06 |
|           |   |   |         | 73/579 |

(Continued)

FOREIGN PATENT DOCUMENTS

| CN | 1039111 A   | 1/1990 |
| DE | 4032299 A1  | 4/1992 |

(Continued)

OTHER PUBLICATIONS

McKetta, John J., editor. Encyclopedia of Chemical Processing and Design. vol. 59, Taylor &ue Francis Inc., 1997. p. 334.*

*Primary Examiner* — John Fitzgerald
*Assistant Examiner* — Alexander A Mercado
(74) *Attorney, Agent, or Firm* — Beusse Wolter Sanks & Maire

(57) ABSTRACT

A method for monitoring the operation of a gas turbine is provided, in which component vibrations are detected during the operation of the gas turbine by an acceleration sensor arranged on the component, a plurality of signal sections being determined by a plurality of frequency bands fb from the signal forwarded and processed by the acceleration sensor. To avoid an unnecessary shutdown of the gas turbine to perform an inspection which subsequently proves unnecessary, thereby increasing the availability of the gas turbine, a total vibration period is determined by adding together the vibration periods of signal sections during which the amplitudes of the signal sections concerned are greater than a frequency band-specific threshold.

7 Claims, 2 Drawing Sheets

(51) Int. Cl.
*G01H 1/00* (2006.01)
*G01H 17/00* (2006.01)

(58) Field of Classification Search
USPC .......................... 73/112.01, 35.01–35.13, 579
See application file for complete search history.

(56) References Cited

U.S. PATENT DOCUMENTS

| | | | |
|---|---|---|---|
| 5,445,028 A | 8/1995 | Garcia | |
| 6,354,071 B2 * | 3/2002 | Tegel | F01D 17/08 |
| | | | 431/114 |
| 6,907,368 B2 * | 6/2005 | Bechtold | G01H 1/00 |
| | | | 340/683 |
| 2008/0223135 A1 | 9/2008 | Griffaton | |
| 2008/0274613 A1 * | 11/2008 | Dernovsek | C23C 4/02 |
| | | | 438/675 |
| 2010/0199680 A1 * | 8/2010 | Nomura | F02C 9/52 |
| | | | 60/773 |
| 2010/0206078 A1 * | 8/2010 | Cheon | E02D 1/022 |
| | | | 73/587 |
| 2012/0142999 A1 * | 6/2012 | Albu | A47G 9/0215 |
| | | | 600/26 |
| 2014/0053574 A1 * | 2/2014 | McConkey | F23N 5/082 |
| | | | 60/803 |

FOREIGN PATENT DOCUMENTS

| | | | | |
|---|---|---|---|---|
| DE | 4124302 A1 | | 1/1993 | |
| FR | 2956481 A1 * | | 8/2011 | ............. G01H 1/003 |

* cited by examiner

FIG 2
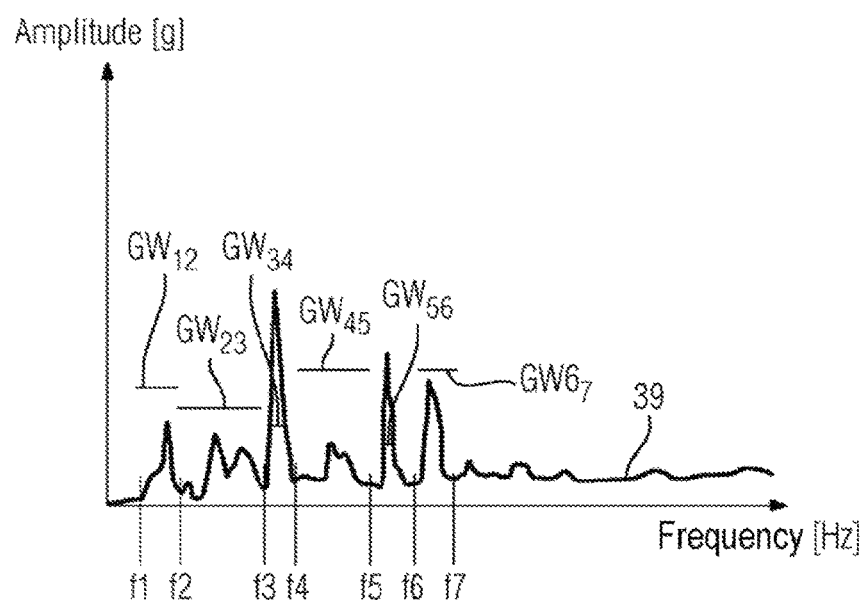
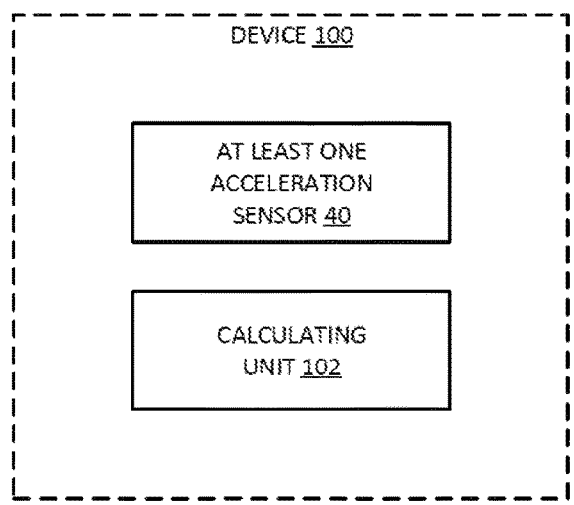
FIG 3

METHOD FOR MONITORING THE OPERATION OF A GAS TURBINE

CROSS REFERENCE TO RELATED APPLICATIONS

This application is the US National Stage of International Application No. PCT/EP2013/065732 filed Jul. 25, 2013, and claims the benefit thereof. The International Application claims the benefit of German Application No. DE 102012215410.8 filed Aug. 30, 2012. All of the applications are incorporated by reference herein in their entirety.

FIELD OF INVENTION

The invention relates to a method for monitoring the operation of a gas turbine, in which component vibrations are detected during the operation of the gas turbine by an acceleration sensor arranged on the component and the signal forwarded from the acceleration sensor establishes a plurality of signal sections by means of a plurality of frequency bands.

BACKGROUND OF INVENTION

Such monitoring processes are often used in gas turbines since combustion vibrations may occur during the combustion of gaseous and liquid fuels, which combustion vibrations may put components surrounding the combustion space into motion. Here, the components surrounding the combustion space are referred to as a combustor, wherein such combustion vibrations may occur both in the case of gas turbines with only a single annular combustor and in the case of gas turbines with a plurality of tube-shaped combustors distributed uniformly across the circumference. These tube-shaped combustors are referred to as "cans". The acceleration sensors supply a signal which reproduces, firstly, the magnitude of the acceleration and, secondly, a frequency spectrum of the combustor accelerations.

In the prior art, the continuous time signal is processed by means of a Fourier transform at short time intervals—for example less than one second—to form a discrete frequency signal representing a corresponding time interval. The frequency spectrum of the processed signal established thus is then subdivided into a plurality of frequency bands and an individual threshold is set for each frequency band. A warning is displayed to the gas turbine operator provided that vibrations with an amplitude which exceeds the associated threshold occur within a frequency band and, if necessary, an emergency shutdown of the gas turbine is carried out so as to protect the combustors from vibrations damaging the component. A person skilled in the art refers to this shutdown as a "trip".

Nevertheless, those accelerations of the combustor which do not trigger a "trip" may also lead to structure-mechanical damage. In the case of annular combustors lined with ceramic thermal shielding bricks, cracks may subsequently occur in the bricks, having a negative influence on the stability and integrity thereof. Moreover, consequential damages may occur, for example in the form of scaling on the support structure of the bricks as a result of hot-gas entry into the cracks.

It is for this reason that combustors, in particular bricked annular combustors, are subject to visual inspections during an inspection at regular time intervals. This should detect such defects at an early stage. If the defects are present, the damaged components or parts are subsequently replaced.

However, the visual inspection of the gas turbine requires downtimes, which reduce the availability of the gas turbine.

It was found that visual inspections are also performed without any findings of damage being noted. In this case, the visual inspection was performed unnecessarily.

SUMMARY OF INVENTION

It is therefore an object of the invention to provide a method for monitoring the operation of a gas turbine, in which previously unnecessary downtimes of the gas turbine for visual inspections can be avoided.

The object underlying the invention is achieved by a method in accordance with the features of the independent claim.

The method according to the invention for monitoring the operation of a gas turbine, in which component vibrations are detected during the operation of the gas turbine by an acceleration sensor arranged on the component and which is subdivided into a signal section or a plurality of signal sections from a signal representing the accelerations, which is based on the signal forwarded by the acceleration sensor, by means of a frequency band or by means of a plurality of frequency bands, provides for an overall vibration period being established by counting those time intervals in which the largest amplitudes in individual signal sections are greater than an associated frequency band-specific threshold. The component may be embodied as a combustor such that combustor vibrations and/or combustor accelerations are detected by the sensor arranged thereon. The signal provided by the sensor is then processed by means of a Fourier transform in short periods of time—which are generally shorter than one second—and subsequently processed further as a signal representing the accelerations for this short time interval.

An overall vibration period is established from the processed signal in a frequency band-dependent manner by a count, weighted by the vibration period, of corresponding time intervals. Independently of whether the time intervals are counted or whether an overall vibration period is established, only those time intervals where amplitudes that are greater than the associated frequency band-specific threshold occur within the damaging frequency bands are taken into account. Compared to the thresholds triggering a "trip", these frequency band-specific thresholds may be smaller. It is also possible that all thresholds of the frequency bands have the same magnitude.

The invention is therefore based on the discovery that not every frequency with a comparatively large amplitude is damaging to the vibrating component and the neighboring components thereof. In this respect, the invention supplies a solution for filtering out such amplitudes.

In order not to reach a maximum admissible overall vibration period or a count threshold prematurely, provision may be made for a few signal sections, in which damaging amplitudes may occur in the long run, to be selected from the processed signal. Expressed differently: those frequency bands whose frequencies do not damage the gas turbine components despite comparatively large amplitudes are not take into account in the invention.

As an alternative to this, a threshold that is selected to be so large that it is never reached could also be associated with those frequency bands in which undamaging frequencies occur. In this respect, there will never be a vibration period which is to be added to the overall vibration period in these frequency bands.

Using the proposed solution, unnecessary downtimes of the gas turbine and the inspections without findings resulting therefrom can be avoided, which may increase the availability of the gas turbine.

Consequently, only those accelerations which lie in a critical frequency band for the component, in particular for the combustor, are summed. According to the invention, accelerations that occur in other non-critical frequency bands are not taken into account.

Advantageous embodiments and developments of the invention are specified in the dependent claims. These can be combined with one another in any desired way.

In accordance with one advantageous embodiment of the invention, the counter is compared to a threshold or the overall vibration period is compared to an overall vibration period threshold and, when the overall vibration period threshold is exceeded, an inspection of the gas turbine, a maintenance of the gas turbine and/or a replacement of gas turbine components is performed.

A device for monitoring the operation of a gas turbine and for carrying out the method therefore comprises at least one acceleration sensor for detecting an acceleration of a component, excitable to vibrate by vibrations, of the gas turbine and a calculation unit for calculating an overall vibration period by summing the vibration periods of the vibrating component, wherein the summation is performed in a frequency-dependent manner.

The advantages emerging for the device are analogous to those of the method according to the invention.

The device may be suitable for carrying out the method according to the invention.

BRIEF DESCRIPTION OF THE DRAWINGS

The invention will be explained in more detail on the basis of an exemplary embodiment. Further advantages and features of the invention are specified in the description of the figures. In detail:

FIG. 2 shows the frequency spectrum of a signal detected by an acceleration sensor at the time $t=t_0$, and FIG. 3 illustrates a device for monitoring the operation of a gas turbine.

DETAILED DESCRIPTION OF INVENTION

Figure 1:
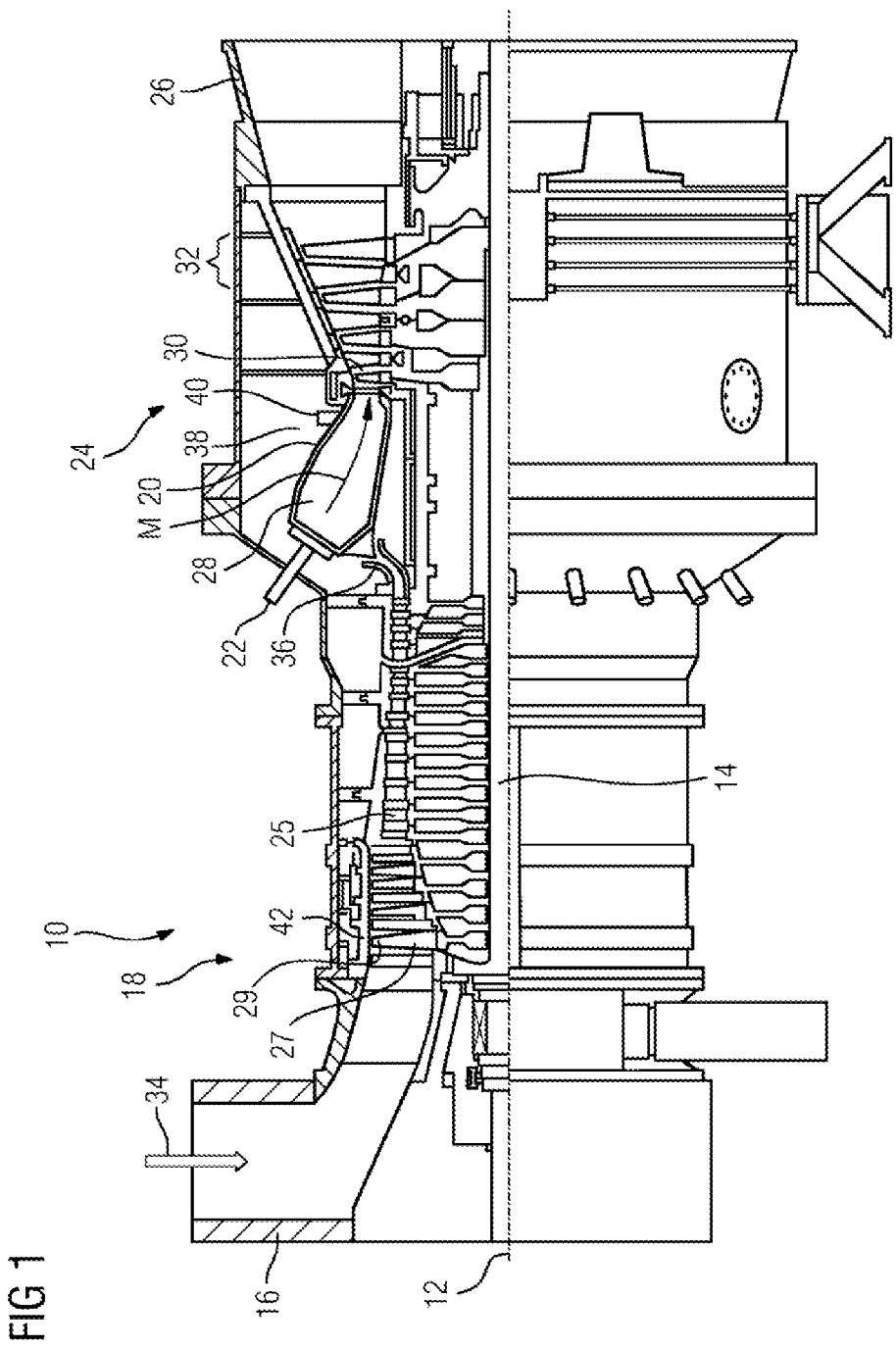
FIG. 1 shows a partial longitudinal cross section through a stationary gas turbine.

FIG. 1 shows a stationary gas turbine 10 in longitudinal partial section. The gas turbine 10 has, inside it, a rotor 14 which is mounted rotatably about an axis of rotation 12 and which is also referred to as a turbine rotor. Along the rotor 14 there are, in succession, an intake housing 16, an axial turbocompressor 18, a toroidal annular combustor 20 comprising a plurality of burners 22 arranged rotationally symmetrically with respect to one another, a turbine unit 24 and a turbine exhaust housing 26.

The axial turbocompressor 18 comprises a ring-shaped compressor duct 25 comprising successive compressor stages—in the manner of a cascade—including rotor blade rings and guide vane rings. The rotor blades 27 arranged on the rotor 14 lie with their free-ending blade airfoil tips 29 opposite an outer duct wall 42 of the compressor duct 25. The compressor duct 25 opens, via a compressor outlet diffuser 36, into a plenum 38. The annular combustor 20 with its combustion space 28 is provided in this plenum, wherein the combustion space is in communication with an annular hot gas duct 30 of the turbine unit 24. Four successive turbine stages 32 are arranged in the turbine unit 24. A generator or a working machine (in each case not shown) is coupled to the rotor 14.

When the gas turbine 10 is in operation, the axial turbocompressor 18 draws in ambient air 34, as the medium to be compressed, through the intake housing 16 and compresses it. The compressed air is fed through the compressor outlet diffuser 36 into the plenum 38, whence it flows into the burners 22. Fuel also passes via the burners 22 into the combustion space 28. There, with the addition of the compressed air, the fuel is burned to give a hot gas M. The hot gas M then flows into the hot gas duct 30 where it expands, performing work, at the turbine blades of the turbine unit 24. The energy released thereby is taken up by the rotor 14 and is used on the one hand to drive the axial turbocompressor 18 and on the other hand to drive a working machine or electric generator.

At least one acceleration sensor 40 for detecting the acceleration of the annular combustor 20 is arranged at the annular combustor 20. Provision can also be made for a plurality of sensors 40, from which either a resulting signal is established or the signals of which are processed separately in accordance with the invention. The sensor signal and/or signals is/are processed in real-time by means of a fast Fourier transform and processed further as discrete frequency signals 39. Below, these frequency signals are referred to as processed signals 39.

FIG. 2 shows the processed signal 39 of the acceleration sensor 40 at the time $t=t_0$, which represents the corresponding time interval. At the same time, the diagram plots a plurality of limit frequencies $f_i$, with $i=1 \ldots n$. In the exemplary embodiment, there is a total of seven limit frequencies $f_1$ to $f_7$. With the aid of the limit frequencies $f_i$, with $i=1 \ldots n$, it is possible to define n−1 frequency bands $fb_{i,i+1}$. The frequency bands fb are provided with the corresponding indices of the limit frequencies such that e.g. the frequency band $fb_{34}$ lies between the two limit frequencies $f_3$ and $f_4$. In the depicted exemplary embodiment, the signal section occurring in the frequency band $fb_{34}$ has the largest amplitude for the acceleration of the annular combustor 20 as component of the gas turbine 10 to be monitored. Naturally, the processed signal 39 need not be subdivided completely into signal sections directly following one another. Naturally, it is also possible only to provide individual, spaced apart frequency bands fb and therefore to monitor individual, spaced apart signal sections. An example for this would be the sole use of two frequency bands, e.g. $fb_{12}$ and $fb_{34}$, for the method according to the invention.

For the sake of completeness, a threshold GW is depicted in the diagram according to FIG. 2 for each frequency band $fb_{i,i+1}$, with $i=1 \ldots 6$, depicted in the exemplary embodiment. Therefore, in accordance with the indexing for the frequency bands fb, there are seven thresholds $GW_{i,i+1}$ for $i=1 \ldots 6$. These thresholds GW may have different magnitudes.

In accordance with aspects of the method, an overall vibration period is intended to be established. When establishing the overall vibration period, the signal section of a frequency band, or the respective signal sections of a plurality of frequency bands, of the time-varying processed signal 39 from the acceleration sensor 40 are monitored continuously. To the extent that the current amplitude(s) of the relevant signal sections occurring in the frequency band fb or in the plurality of frequency bands fb are greater than a frequency band-specific threshold GW, the time period, during which the amplitudes of the relevant signal sections are greater than the associated frequency band-specific threshold GW, of the overall vibration period is added. This applies to each observed frequency band fb.

Since the invention is based on the discovery that not every relatively large amplitude of an acceleration of the monitored component—usually the annular combustor 20—is damaging to the relevant component, some signal sections of the processed signal 39 from the acceleration sensor 40, which consequently lie outside of the frequency bands fb, remain unconsidered.

Not considering a non-damaging frequency band fb could also be achieved by virtue of the threshold GW thereof being set to such a large value that is never physically reached during the operation of the gas turbine 10.

Furthermore, provision is made for the overall vibration period to be compared to an overall vibration period threshold and, if the overall vibration period exceeds the overall vibration period threshold, for an inspection of the gas turbine 10, maintenance of the gas turbine 10 and/or replacement of gas turbine components to be performed.

Thus, overall, the invention relates to a method for monitoring the operation of a gas turbine 10, in which component vibrations are detected during the operation of the gas turbine 10 by an acceleration sensor 40 arranged on the component, a plurality of signal sections being determined by means of a plurality of frequency bands fb from the signal 39 forwarded and processed by the acceleration sensor 40. To avoid an unnecessary shutdown of the gas turbine 10 to perform an inspection which subsequently proves unnecessary, thereby increasing the availability of the gas turbine 10, the invention proposes determining a total vibration period by adding together those vibration periods of the signal sections during which the amplitudes of the signal sections concerned are greater than a frequency band-specific threshold.

FIG. 3 illustrates a device 100 for monitoring the operation of a gas turbine and for carrying out the method therefore comprises at least one acceleration sensor 40 for detecting an acceleration of a component, excitable to vibrate by vibrations, of the gas turbine and a calculation unit 102 for calculating an overall vibration period by summing the vibration periods of the vibrating component.

The invention claimed is:
1. A method, comprising:
operating a gas turbine having an annular combustor with a burner to produce energy;
burning of fuel by the burner during the operation of the gas turbine;
monitoring vibrations of the annular combustor during the operation of the gas turbine by an acceleration sensor coupled on the annular combustor and being excitable to vibrate by vibrations of the annular combustor during the operation of the gas turbine, wherein the monitoring comprising:
detecting accelerations associated with the annular combustor during the operation of the gas turbine by the acceleration sensor wherein the accelerations include acceleration amplitudes in damaging frequency bands and acceleration amplitudes in non-damaging frequency bands wherein the damaging frequency bands being associated with structure-mechanical damage to the annular combustor from vibration of the annular combustor, and
forwarding a sensor signal representative of the detected accelerations of the annular combustor to a calculating unit;
processing, by the calculating unit, the sensor signal;
subdividing, by the calculating unit, a discrete frequency signal representing the accelerations by means of a frequency band or by means of a plurality of frequency bands into a signal section or a plurality of signal sections on the basis of the sensor signal forwarded during operation of the gas turbine by the acceleration sensor wherein each signal section associated with a respective section time interval,
wherein the discrete frequency signal represents a corresponding time interval of the sensor signal, and wherein those section time intervals in which only the acceleration amplitudes in the damaging frequency bands which are detected as being greater than an associated frequency band-specific threshold are counted to form a count,
establishing, by the calculating unit, an overall vibration period based on the count for only the damaging frequency bands; and
comparing the overall vibration period to an overall vibration period threshold wherein if the overall vibration period exceeds the overall vibration period threshold, the gas turbine is caused to be shutdown.

2. The method as claimed in claim 1,
wherein the establishing of the overall vibration period further comprising summing, by the calculation unit, said those section time intervals wherein the summing is in a frequency-dependent manner.

3. The method as claimed in claim 1,
wherein when the overall vibration period threshold is exceeded, an inspection of the gas turbine, a maintenance of the gas turbine and/or a replacement of gas turbine components is performed.

4. The method as claimed in claim 1,
wherein the accelerations are combustion vibrations and the annular combustor is a toroidal annular combustor.

5. A gas turbine, comprising:
a plurality of gas turbine components including an annular combustor having a burner to burn fuel during operation for production of energy;
a device caused to monitor operation of the gas turbine configured to produce the energy during operation, the device comprising:
an acceleration sensor coupled on the annular combustor, the acceleration sensor for detecting accelerations of the annular combustor during the operation of the gas turbine, and which is excitable to vibrate by vibrations of the annular combustor during the operation of the gas turbine and forwarding a sensor signal representative of the accelerations during operation of the gas turbine wherein the accelerations include acceleration amplitudes in damaging frequency bands and acceleration amplitudes in non-damaging frequency bands wherein the damaging frequency bands being associated with structure-mechanical damage to the annular combustor from vibration of the annular combustor, and
a calculation unit for processing the sensor signal and calculating an overall vibration period based on the sensor signal by summing only section time periods of signal sections having the acceleration amplitudes within only the damaging frequency bands which are detected as being greater than a frequency band-specific threshold, and causing the overall vibration period to be compared with an overall vibration period threshold wherein the summing by the calculation unit is performed in a frequency-dependent manner and if the overall vibration period exceeds the overall vibration period threshold, the gas turbine is caused to be shutdown.

6. A gas turbine, comprising:
a plurality of gas turbine components including an annular combustor having a burner to burn fuel;
a device caused to monitor operation of the gas turbine, the device comprising:
  an acceleration sensor for detecting an acceleration of the annular combustor, excitable to vibrate by vibrations, during the operation of the gas turbine, and
  a calculation unit for calculating an overall vibration period,
wherein the gas turbine produces energy during operation and is adapted to perform the method as claimed in claim 1.

7. The gas turbine as claimed in claim 5,
wherein the accelerations are combustion vibrations and the annular combustor is a toroidal annular combustor.

* * * * *